(12) United States Patent
Peng

(10) Patent No.: US 7,970,546 B1
(45) Date of Patent: Jun. 28, 2011

(54) DIPLET-BASED IMAGING OF SEISMIC DATA IN SHOT OR RECEIVER RECORDS

(75) Inventor: Chengbin Peng, Sugar Land, TX (US)

(73) Assignee: WesternGeco L.L.C., Houston, TX (US)

( * ) Notice: Subject to any disclaimer, the term of this patent is extended or adjusted under 35 U.S.C. 154(b) by 368 days.

(21) Appl. No.: 12/140,349

(22) Filed: Jun. 17, 2008

Related U.S. Application Data

(60) Provisional application No. 60/945,810, filed on Jun. 22, 2007.

(51) Int. Cl.
*G01V 1/00* (2006.01)
*G01V 1/28* (2006.01)

(52) U.S. Cl. .................. 702/16; 367/53; 367/73; 702/17

(58) Field of Classification Search .................... 702/11, 702/14, 16, 17, 18, 189; 703/5, 10; 367/53, 367/68, 73
See application file for complete search history.

(56) References Cited

U.S. PATENT DOCUMENTS

| 5,274,605 | A |   | 12/1993 | Hill |
| 5,530,679 | A | * | 6/1996 | Albertin ........................ 367/68 |
| 5,671,136 | A | * | 9/1997 | Willhoit, Jr. .................... 702/18 |

OTHER PUBLICATIONS

Chen et al., Target-Oriented Beamlet Migration Based on Gabor-Daubechies Frame Decomposition, Mar.-Apr. 2006, Geophysics, vol. 71, No. 2, pp. S37-S52.*
Albertin, et al., True-Amplitude Beam Migration, SEG International Exposition and 74th Annual Meeting, Oct. 2004.
Gray, Gaussian Beam Migration of Common-Shot Records, SEG International Exposition and 74th Annual Meeting, Oct. 2004.
Nowack, Common-Offset Gaussian Beam Inversion: Final Report, Earth and Atmospheric Sciences, Purdue University, Jul. 2004.
Raz, Beam Stacking: A Generalized Preprocessing Technique, Geophysics, Sep. 1987, pp. 1199-1210, vol. 52, No. 9.
Chavez-Perez, et al., Crustal Imaging in Southern California using Earthquake Sequences, 7th International Symposium on Deep Seismic Profiling of the Continents, Sep. 1996.
Hennenfent, et al., Seismic Denoising with Nonuniformly Sampled Curvelets, Noise and Signal Interaction, IEEE, 2006.
Nowack, et al., The Two-Dimensional Gaussian Beam Synthetic Method: Testing and Application, Journal of Geophysical Research, Sep. 10 1984, pp. 7797-7819, vol. 89, No. B9.
Wu, et al., Wave Propagation and Imaging Using Gabor-Daubechies Beamlets, Modeling and Imaging Laboratory, IGPP, University of California, Oct. 2001.
3D Beam Prestack Depth Migration with Examples from Around the World, Tech Link, A Publication of Petroleum Geo-Services, Aug. 2008, pp. 1-6, vol. 8, No. 8.
Chen, et al., Target-Oriented Beamlet Migration Based on Gabor-Daubechies Frame Decomposition, Geophysics, Mar.-Apr. 2006, pp. S37-S52, vol. 71, No. 2.
Jin, et al., Seismic Depth Migration with Pseudo-Screen Propagator, Computational Geoscience, 1999, pp. 321-335, vol. 3.

* cited by examiner

*Primary Examiner* — John H Le

(57) ABSTRACT

Methods, systems, and software for representing seismic shot or receiver data as a superposition of a plurality of diplets are disclosed. The method includes decomposing one or more prestack shot or receiver records into a set of diplets, migrating the diplets using one or more velocity models, and synthesizing one or more migrated diplets into a migrated seismic volume, wherein each diplet comprises information about spatial location, orientation, amplitude, an associated wavelet, acquisition configuration, and coherency.

20 Claims, 9 Drawing Sheets
(3 of 9 Drawing Sheet(s) Filed in Color)

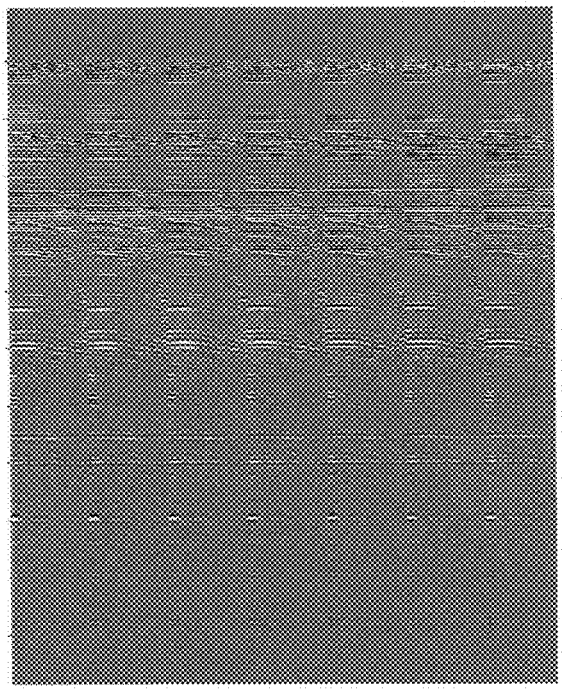 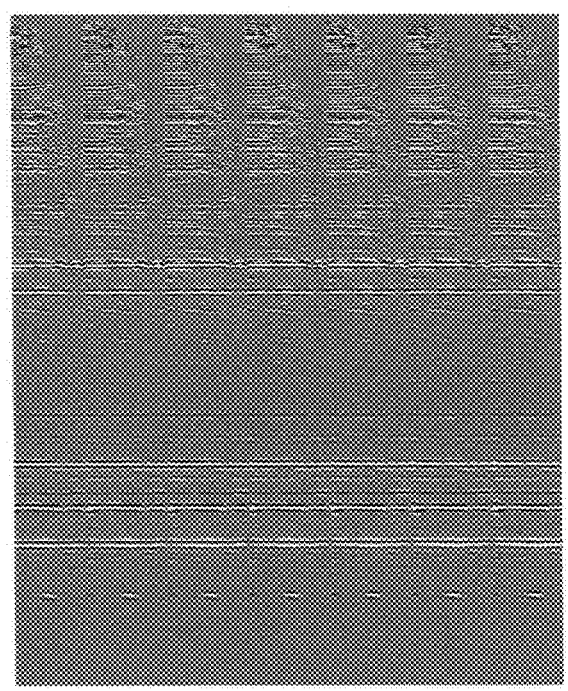
*FIG. 8A*   *FIG. 8B*

DIPLET-BASED IMAGING OF SEISMIC DATA IN SHOT OR RECEIVER RECORDS

CROSS-REFERENCE TO RELATED APPLICATION

This application claims priority to U.S. Provisional Patent Application No. 60/945,810, filed Jun. 22, 2007, entitled "Diplet-based Imaging of Seismic Data in Shot or Receiver Records," by Chengbin Peng, which is hereby incorporated by reference. This application is related to U.S. patent application Ser. No. 11/749,795, filed May 17, 2007, entitled "Diplet-Based Seismic Processing," by Chengbin Peng, which is hereby incorporated by reference.

BACKGROUND

The present disclosure relates generally to seismic imaging. More specifically, the present disclosure relates to method, software, and systems for imaging seismic data acquired in a wide azimuth configuration, such as wide azimuth marine seismic data, wide azimuth land seismic data, wide azimuth OBS data (ocean bottom seismometer node), OBC data (ocean bottom cable data), and VSP/vertical cable seismic surveys.

Subsalt seismic image quality in the deep water Gulf of Mexico is often very poor when conventional narrow azimuth 3D data sets are used, even with the most advanced processing and imaging methods as discussed in *Regone, C.* 2006, A modeling approach to wide azimuth survey design for subsalt imaging: SEG Summer Research Workshop, Snowbird, Utah. This is due, at least in part, to the narrow azimuth acquisition geometry typical of towed streamer 3D seismic surveys. As a result, the oil and gas industry is moving towards acquiring seismic data that has better azimuth coverage, and, presumably, better illumination. These types of seismic acquisitions can be designed to make wave equation based shot record migrations very efficient as described in *Howard, M.* 2004, Rich Azimuth Marine Acquisition, EAGE Research Workshop, Advances in Seismic Acquisition Technology.

Acquiring wide azimuth seismic data is expensive when compared to conventional seismic data acquisition, and presents significant challenges in the subsequent processing, imaging, and interpretation of the data due to the shear size and high dimensionality of the data volume. For example, most existing tomographic velocity updating methods are designed with narrow azimuth assumptions and with offset image gathers as input. The wave equation based shot record migrations will not be able to produce the kind of gather output required by most velocity analysis and updating software. Current practice is to resort to conventional Kirchhoff prestack depth migration with a subset of the data (based on the azimuth range) to produce migrated gathers for 3D velocity model building as described in Ladart, S. et al., 2006, Wide Azimuth Tomography—is it necessary? SEG Technical Program Expanded Abstract. As a result, the accuracy of 3D subsurface velocity models may be greatly compromised.

SUMMARY OF THE INVENTION

In general, in a first aspect, the invention features a method for representing seismic shot or receiver data as a superposition of a plurality of diplets. The method includes decomposing one or more prestack shot or receiver records into a set of diplets, migrating the diplets using one or more velocity models, and synthesizing one or more migrated diplets into a migrated seismic volume. Each diplet comprises information about spatial location, orientation, amplitude, an associated wavelet, acquisition configuration, and coherency.

In general, in a second aspect, the invention features a computer program, stored in a tangible medium for representing seismic shot or receiver data as a superposition of a plurality of diplets. The computer program includes executable instructions that cause at least one processor to decompose one or more prestack shot or receiver records into a set of diplets, migrate the diplets using one or more velocity models, and synthesize one or more migrated diplets into a migrated seismic volume. Each diplet comprises information about spatial location, orientation, amplitude, an associated wavelet, acquisition configuration, and coherency.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 8A and 8B are example migrated offset image gathers.

DETAILED DESCRIPTION

The methods, systems, and software of the present disclosure are based on diplet imaging described in U.S. patent application Ser. No. 11/749,795, filed May 17, 2007, entitled "Diplet-Based Seismic Processing," by Chengbin Peng which is incorporated by reference.

Figure 10:
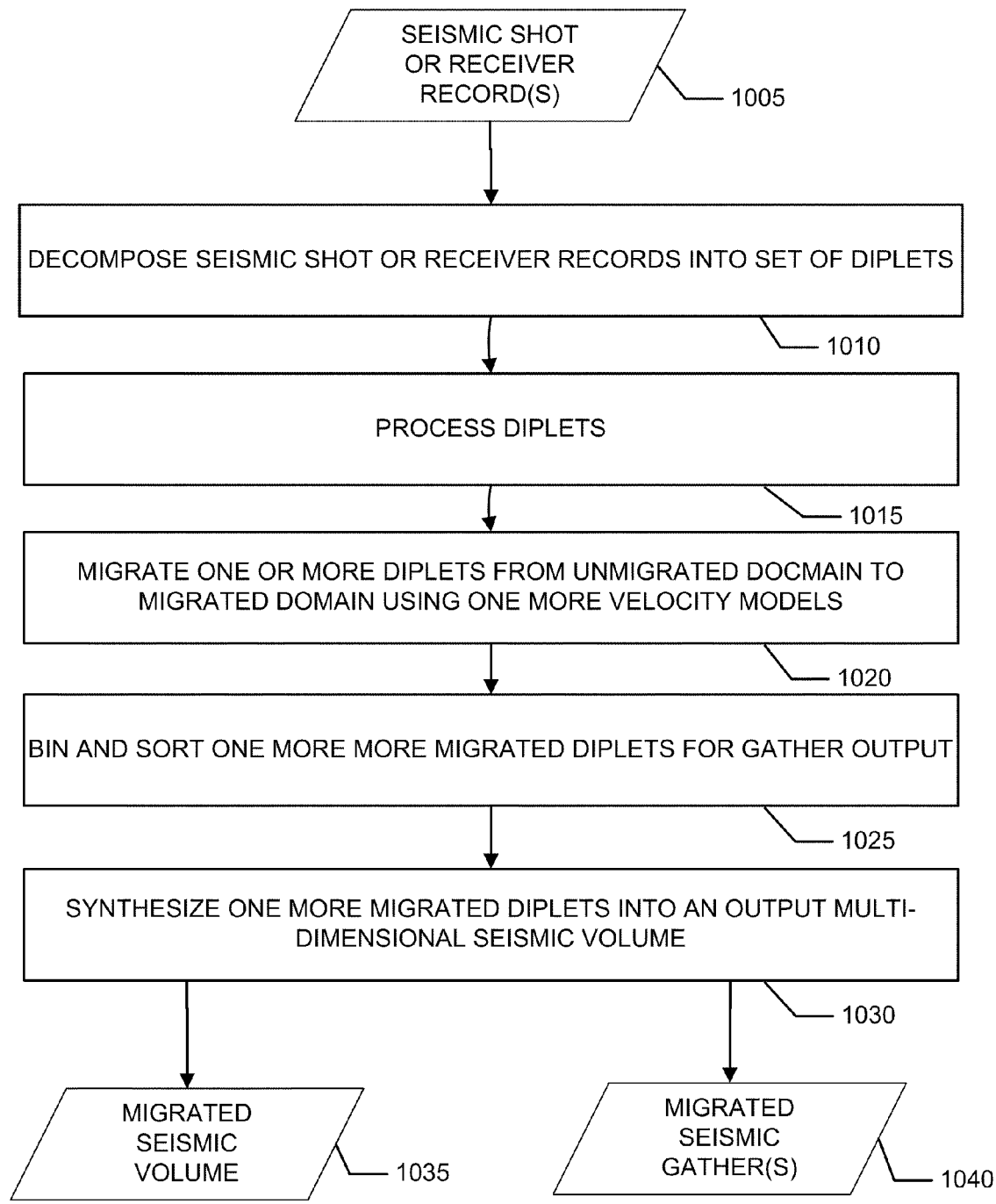

FIG. 10 is a flow chart of an example method of the present disclosure. The method includes receiving one or more seismic shot or receiver records (block 1005). In general, a short record is a collection of seismic traces that have a common source location. In general, a receiver record is a collection of seismic traces that have a common receiver location. In certain example implementations, the seismic shot or receiver records are from wide azimuth marine surveys. In other example implementations the seismic shot or receiver records are from one or more of ocean-bottom cable surveys, wide azimuth land surveys, ocean bottom seismometer surveys.

In block 1010, the method includes decomposing one or more of the seismic shot or receiver records 1005 into a set of diplets. As discussed in greater detail below, a diplet is an object that includes information about one or more of a spatial location, spatial orientation, amplitude, wavelet, coherency, acquisition configuration. Certain example diplets further include other derived attributes such as one or more of subsurface reflection angle, reflection azimuth, wavelet stretch, and beam spreading. In certain example implementations, the actual wavelet is stored in a wavelet bank and each diplet has an ID to the bank for storing and retrieving seismic wavelets. In sharp contrast to other related concepts such as decomposition into beams, a diplet contains enough information such that it can survive complex mathematical transformations such as 3D time or depth migration. The same decomposition can be applied to seismic data in receiver records by virtue of the well-known reciprocity principal.

The method includes performing pre-migration processing of diplets in the set of diplets (block 1015). In some example implementations, block 1015 is omitted. In certain example implementations, processing of diplets includes using calculated attributes to generate physically meaningful subsets. Other example implementations include processing of diplets includes using calculated attributes to separate signal from noise. Other example implementations include processing of diplets includes using calculated attributes to enhance the signal.

The method includes migrating one or more diplets in the set of diplets from an unmigrated domain to a migrated domain (block 1020). This migration employs a velocity model. One example velocity model is an anisotropic velocity model. This migration establishes a connection between a data diplet (i.e., a diplet in the unmigrated domain) to an image diplet (i.e., a diplet in the migrated domain).

In implementations, where a gather output is desired, the method includes binning and sorting one more migrated diplets (block 1025). In some implementations, this step is omitted. In general, diplets from all or from a subset of shot or receiver records can be binned and sorted based on any combination of attributes to achieve additional subsets. Example subsets include offset gathers, reflection-angle gathers, reflection-azimuth gathers, acquisition-azimuth gathers, and gathers of various combinations of these attributes. As used herein, "binning and sorting" (and derivatives thereof) may include a single data processing step.

The method further includes synthesizing one or more migrated diplets (block 1030) into a migrated seismic volume 1035. In the case of binned and sorted diplets, the output may include one or more migrated seismic gathers 1040.

The types of possible gather outputs of method include, by way of example, one or more of:
  offset image gather (indexed by the absolute acquisition offset);
  angle image gather (indexed by the subsurface reflection angle);
  azimuth image gather (indexed by acquisition azimuth);
  offset and azimuth image gather (indexed by acquisition offset and acquisition azimuth pair);
  angle and azimuth image gather (indexed by subsurface reflection angle and reflection azimuth pair);
  shot image gather (indexed by shot location);
  receiver image gather (indexed by receiver location);
  takeoff angle image gather (indexed by takeoff angle at surface); and
  other image gather (indexed by other attributes of image diplets).
  combination gathers including, for example, offset-azimuth gathers, reflection angle-reflection azimuth gathers.

Shot or Receiver Record Migration: Overview

3-D prestack depth migration is a widely-used seismic imaging tool in the oil and gas industry. Most prestack depth migration software is optimized for conventional marine seismic data in cdp/offset configuration, which is limited to narrow azimuth data. Common shot migration (or shot record migration) is able to handle wide azimuth acquisition and irregular topography, and is more suitable for modern marine data, land data and ocean bottom cable (OBC) data.

Two approaches are usually used for shot-record migration: (a) the Wave Equation Migration (WEM) method, and, (b) the Kirchhoff Integral Migration. Gaussian beam migration as described in Hill, N., R., 2001, Prestack Gaussian-beam depth migration: Geophysics, 66, 1240-1250, belongs to the Kirchhoff Integral Migration family. WEM can handle strong lateral velocity variations, but is limited when it comes to imaging steep dips. Kirchhoff migration can image very steep dips and can produce offset image gathers, but is not as accurate as WEM in complex velocity models.

The present disclosure is related to diplet-based shot or receiver domain migration. The first step is the wavefield decomposition into diplets (data diplets). The second step is the migration of diplets from the data space into the image space (image diplets). The final step is the superposition of contributions of all the image diplets to form migrated volumes.

Wavefield Decomposition: The Concept of Data Diplets

Assuming that the input data is defined in the shot domain, $D(t, \vec{x}_r; \vec{x}_s)$ Here, $\vec{x}_r$ and $\vec{x}_s$ are the receiver coordinate and source coordinate respectively. At each time sample, D can be represented as superposition of a set of linear events (in 2D, for example):

$$D(t, \vec{x}_r, \vec{x}_s) = \sum_{j=1,N} S_j(t) * \delta(t - x_r p_{xj}) \qquad \text{(Eq. 1)}$$

where N is the number of dips at one time sample, $S_j(t)$ is the wavelet at t, and p is the slowness vector.

Physically, this decomposition implies that data at each location $(t, \vec{x}_r, \vec{x}_s)$ is considered as the superposition of the events with different dips. For a complex wavefield, especially for those collected from complex geological environments, it is common to have overlapping dipping events. Different dipping events have different emerging angles at the same detector location. To ensure accuracy of the final image, all the dips at all receiver locations should be preserved as much as possible.

After decomposition, the continuous seismic wavefield is represented by a sparse set of diplets.

In some example implementations, the decomposition of (1) is implemented using frequency domain using dip-filtering:

$$\left(\left(D(\omega, \vec{x}_r, \vec{x}_s) e^{i\omega x p_x}\right) * W(\vec{x}_r)\right) e^{-i\omega x p_x} \approx \sum_{p_{xj}=p_x} S_j(\omega) e^{-i\omega(x p_x)} \qquad \text{(Eq. 2)}$$

Here $D(\omega, \vec{x}_r, \vec{x}_s)$ is the frequency domain. $W(\vec{x}_r)$ is a dip filtering operator. The above process is basically equivalent to a dip filtering (dip matching) with the addition of a picking procedure. Picking is done in the time domain after applying an inverse Fourier transform of (2). The output is $D(t, \vec{p}(\vec{x}_r), \vec{x}_r, \vec{x}_s)$, in the time domain, which is called a diplet. Each diplet represents the wavelet which propagates into the earth along a particular direction. The added dimension is the slowness vector which implies that at each time and space sample $(t, \vec{x}_r, \vec{x}_s)$, there may be multiple arrivals from different directions. This feature is necessary for characterizing complex wavefields. The decomposition mostly solves the multi-pathing problems in the migration process. There are pathological cases where two packs of seismic energy reach the same location at the same time and in the same direction, which can not be handled here. However, they can be modeled using high-order diplets (e.g., curvelets).

The decomposed $D(t, \vec{p}(\vec{x}_r), \vec{x}_r, \vec{x}_s)$ will be used for imaging, $D(t, \vec{p}(\vec{x}_r), \vec{x}_r, \vec{x}_s)$ is in discrete form and can be organized in any order. Specifically, it can be sorted into surface emerging angle gathers (Gray, 2006) in which all diplets in each gather has, for marine data, the same take-off angle. At most $(t, \vec{x}_r, \vec{x}_s)$ locations, the maximum number of overlapping dips is usually five. For the majority of $(t, \vec{x}_r, \vec{x}_s)$ locations, there exist two arrivals or one single arrival (see the shot gathers in the Example section).

Shot or Receiver Record Migration in Diplet Domain: Build the connection between data diplets and image diplets Once the shot record data has been decomposed to data diplets, imaging is carried out for diplets within each shot record and the final image is the superposition of the contributions from all the image diplets. For each data diplet in (1), its corresponding (prestack) image diplet is given by the following mapping (under high-frequency assumption):

$$\sum_{\varpi} W(\vec{x}, \vec{p}_r, \vec{p}_s, \vec{x}_r, \vec{x}_s) \frac{\partial G^*(\varpi, \vec{x}, \vec{x}_r)}{\partial z_r} \quad \text{(Eq. 3)}$$

$$G^*(\varpi, \vec{x}, \vec{x}_s) D(\varpi, \vec{p}(\vec{x}_r) \vec{x}_r, \vec{x}_s) \Rightarrow I(\vec{n}, \vec{p}, \vec{x})$$

where W is the weighting function used for compensating for illumination and acquisition effects and $D(\varpi, \vec{p}(\vec{x}_r), \vec{x}_r, \vec{x}_s)$ is the frequency domain representation of $D(t, \vec{p}(\vec{x}_r), \vec{x}_r, \vec{x}_s)$. One sample $(\vec{n}, \vec{p}, \vec{x})$ defines one imaged reflector in a seven dimensional space, which is characterized by $\vec{x}$ (the position of the imaged reflector), $\vec{n}$ (the orientation of the reflector) and $\vec{p}$ (the specular ray information for the rays from the source to the image point and from the image point to the receiver, or simply the incidence slowness vector). There are multiple ray-paths possible for one source-receiver pair. The G's are the Green's functions which represents the ray-tracing process in our case. G* is the conjugate of G which represents wave propagation in the reverse direction for the receiver wavefield. In certain example implementations, equation (3) is implemented in the time domain.

Figure 2:
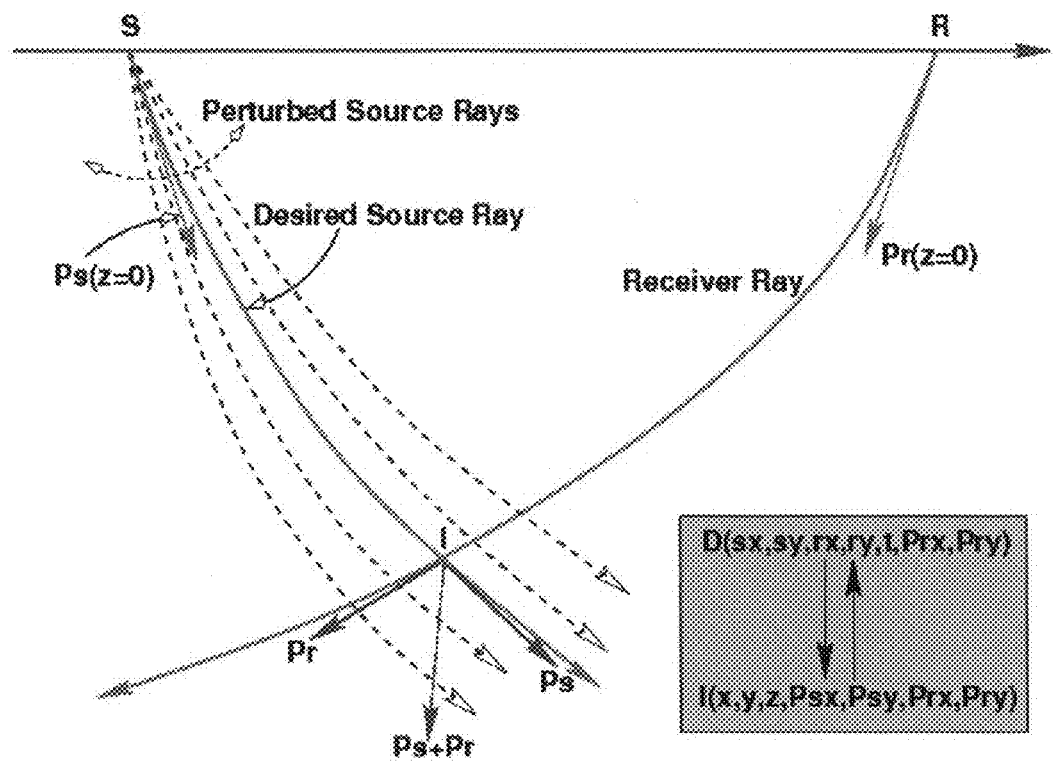
FIG. 2 is an illustration of diplet-based imaging of seismic data in shot records . . . .

Equation (3) implies that after migration, the seven-dimensional input data (source [2], receiver [2], time [1], slowness vector [2]) is transformed into another seven-dimensional data defined in the subsurface image space (location [3], reflector orientation vector [2] and incidence vector [2]). For successfully imaged diplets, no information is lost during this transformation. A graphic representation of this transformation is shown in FIG. 2. In FIG. 2, the ray from the receiver location is fixed by its ray parameter. The rays from the shot side are searched for imaging conditions to be satisfied. These rays are used in imaging all diplets within a short record. The directions of $\vec{n}$ and $\vec{p}$ are defined by the model (ray-tracing), not by the data. They should be recorded by the imaging process and eventually stored in image diplets. For land data and OBC data, we assume that sources and receivers are defined on a predefined topological surface which can be represented as $\vec{x} = \vec{x}(\xi_1, \xi_2)$.

We should emphasize that both the data and the image are now in discrete forms. If imaged successfully, each data diplet has one corresponding image diplet and vice versa. By carefully indexing the connection between each data diplet and its corresponding image diplet, we can preserve that connection in each step of the processing flow. This connection is powerful for many purposes. For example, subsurface angle information can be easily computed from $\vec{n}$ and $\vec{p}$ for each image and data diplet using this connection.

The final stacked image is computed as follows:

$$I(\vec{x}) = \quad \text{(Eq. 4)}$$

$$\sum_{\varpi} \sum_{\vec{x}_s} \sum_{\vec{x}_r} \sum_{\vec{p}_s} \sum_{\vec{p}_r} W(\vec{x}, \vec{p}_r, \vec{p}_s, \vec{x}_r, \vec{x}_s) \frac{\partial G^*(\varpi, \vec{x}, \vec{x}_r)}{\partial z_r}$$

$$G^*(\varpi, \vec{x}, \vec{x}_s) D(\varpi, \vec{p}(\vec{x}_r), \vec{x}_r, \vec{x}_s)$$

Or more properly:

$$I(\vec{x}) = \sum_{\vec{n}} \sum_{\vec{p}} M(\vec{n}, \vec{p}, \vec{x}) I(\vec{n}, \vec{p}, \vec{x}) \quad \text{(Eq. 5)}$$

where $M(\vec{n}, \vec{p}, \vec{x})$ is the angle-dependent filter for each image diplet.

Figure 1:
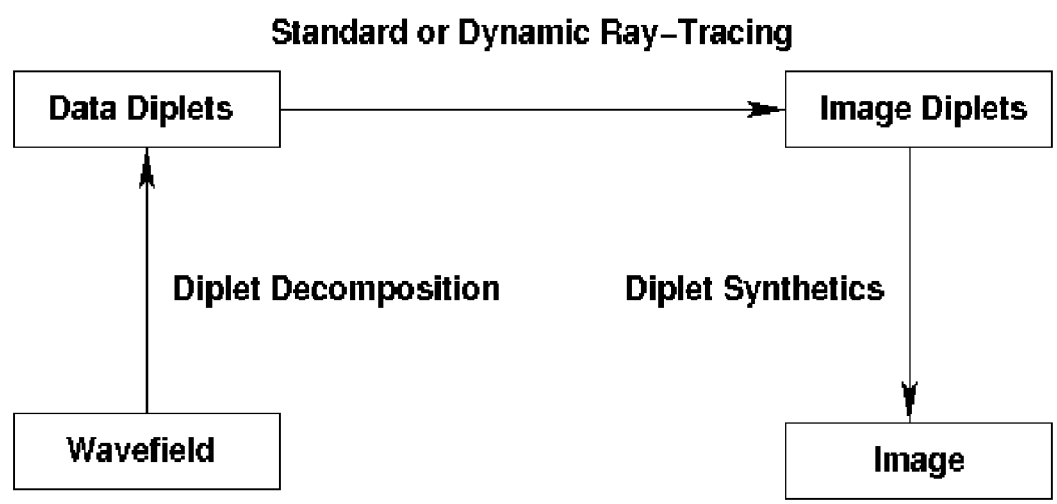
FIGS. 1 and 10 are flow charts illustrating example methods of the present disclosure.

FIG. 1 shows the general steps for certain embodiments of the disclosed imaging method. Data diplets are generated after shot record wavefield decomposition in the first step. This step is usually done in the time-space domain. Data diplets are migrated and image diplets are produced. Image diplets are synthesized to obtain the image volumes or gathers. The conversion from data diplets to image diplets is the migration process (in equation [3]). Data diplets and image diplets have a one-to-one correspondence. Migration is done one shot or receiver record at a time for reasons of efficiency (it can also be done one diplet at a time which is less efficient).

This three-step imaging approach has several advantages over the traditional imaging method. First, by tracking the imaging process for each data diplet, we can clearly understand which diplet can be successfully migrated and which cannot. Failed diplets (i.e. diplets that were not migrated) can be rationalized as follows: given that diplets are decomposed data elements, we have the ability to tell coherent arrivals that are successfully migrated from those that are not. Those cannot be coherently migrated are either multiples or different types of noises that are not supported by a given velocity model. Our approach is capable of automatic wavefield separation/noise attenuation during migration.

Secondly, by working with diplets, we can apply different types of QCs on the data diplets before migration or on the image diplets after migration. QCs can be done either in time-space domain, or more importantly in sub-angle domain. This angle domain QC is difficult to implement in traditional migrations.

Also, FIG. 1 shows a clear separation between data and the imaging process, the latter is algorithm-dependent and often has limitations. The important points implied in this separation is that once the data is decomposed into diplets and possibly after various QC steps, migration can be carried out repeatedly and, if required, using different methods. For example, applying dynamic ray-tracing may lead to Gaussian beam migration. Thus different images can be obtained from a single set of inputs. By doing so, each method can be assessed at the atomic level, i.e., the diplet is the smallest data element.

Another example approach is built on conventional Kirchhoff migration which requires the computations of time and amplitude tables for each of the grids on the surface. During the imaging process, the desired ray-path is found by scanning all the combinations of source and receiver pairs for the one with the minimum value of imaginary time. Gray's method has the potential to find the complete solution for each source-receiver pair. Instead, we use two-point ray-tracing to find the desired ray from the source to the image point and to the receiver and thus reduce the computation and storage cost. The two-point ray-tracing solution is the stationary solution (Sun, 2001).

Certain example implementations of the methods of the present disclosure are parallelized. FIG. 2 shows the principle of one such implementation. For each common shot record, decomposition is carried out first to produce data diplets at selected time samples at each receiver path. Coherence and amplitude thresholds must be applied to select only those that are significant. To avoid making too many picks, a time window is needed. Wavelets are extracted at each pick during decomposition.

The dip at a receiver location is known for a given diplet. The dip at the corresponding source location needs to be found. For each diplet, we select the dip at the source location by perturbing source rays so that the following two conditions are met:

$$|T(S \to I_s) + T(R \to I_R) - T_0| \leq \epsilon_T \quad \text{(Eq. 6)}$$

$$|I_S - I_R| \leq \epsilon_x \quad \text{(Eq. 7)}$$

Here $T(S \to I_S)$ is the travel time from the source to a certain subsurface point $I_s$ along the source ray and $T(R \to I_R)$ is the travel time from receiver to a certain subsurface point $I_R$ along the receiver ray. The output source ray is the desired source ray that satisfies the above two conditions. The average points of $I_s$ and $I_R$ is used as the position of the image point. In addition, other useful parameters can be computed such as the incidence angle, the opening angle and the normal of the reflector as indicated in equation (3).

Compared with traditional migration methods, a large amount of time/amplitude tables do not have to be computed or stored. For sedimentary ray paths, usually 10 or fewer rays are needed in order to converge to final solutions.

This imaging process can be highly parallelized both for the decomposition and for the imaging. The decomposition can be parallelized over shot or receiver gathers and the imaging can be done over diplets within a shot or receiver record or a set of diplets with many shot or receiver records.

It should be pointed out that conditions (6) and (7) are very general. There may be multiple source ray paths defined by (6) and (7). For example, in the case that there is a low velocity zone along the source ray paths, the wavefront will deviate from a perfect circle. Wavefronts traveling inside the low velocity zone will be slower than those around it. This implementation can only take one of the possible source rays. It is up to the imaging process and imaging condition to find other possible solutions, which means a more complicated ray-tracing scheme, such as wavefront construction, is needed to find the complete solution. But, if the one found is the dominant peak in terms of the amplitude, then the influence of the missing solution is minor Post Migration Processing of the Image Diplets The imaging process given in equation (3) represents the mapping of each diplet from data space to image space. With some additional binning and sorting which costs little computational effort, the image diplets can be used to form partial images that are indexed by local reflection angles and/or local azimuths. Different gathers can also be computed from Error! Objects cannot be created from editing field codes. Surface offset-indexed gathers can easily be converted into subsurface opening angle-indexed gathers. This obvious advantage comes from the fact that local information, such as dips in time domain or in depth domain, is part of the diplet representation.

Each image diplet can be independently scaled and filtered based on its spatial location, spatial orientation, or coherency, for purposes of signal enhancement and/or noise attenuation.

Figure 3:
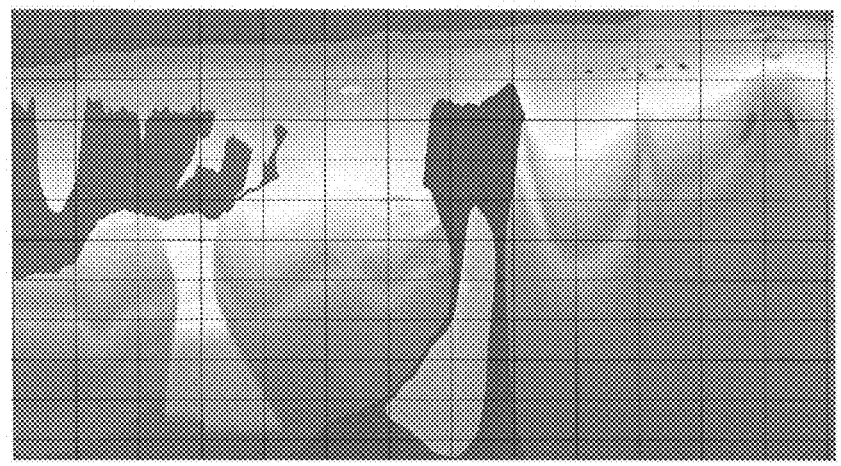
FIG. 3 is an example velocity model.
Figure 4A:
FIGS. 4A and 4B are example shot gathers.
Figure 4B:

One example implementation uses the BP 2004 benchmark dataset as described in *Billette, F. J., and Brandsberg-Dahl, S.,* 2005, The 2004 BP velocity benchmark: $67^{th}$ Meeting, European Association of Geoscientists and Engineers, Expanded Abstracts, B035. This dataset is used to demonstrate the concept of diplet imaging of seismic data in shot records. The velocity model is shown in FIG. 3. FIGS. 4A and 4B show sample shot gathers. In FIG. 4A, the shot is located at 15000 meters. In FIG. 4B, the shot is located at 30000 meters.

Figure 5A:
FIG. 5A is an original shot record.
Figure 5B:
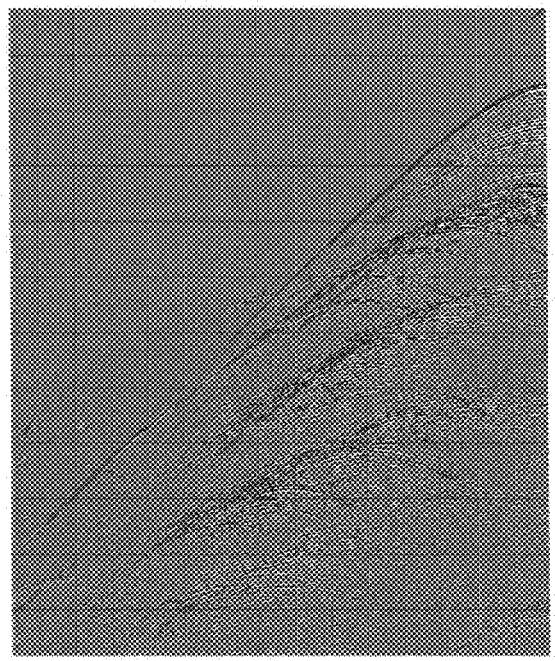
FIG. 5B is a synthesized shot record.

FIGS. 5A and 5B show the comparison of the original common shot data in FIG. 5A for a shot located at 15050 m, which is located at the left part of the model, and the synthesized data (FIG. 5B) from the decomposed data diplets at the same shot location. Crossing events in the shot gather are picked up well by the decomposition. Both the kinematics and dynamic characteristics are preserved.

Figure 6:
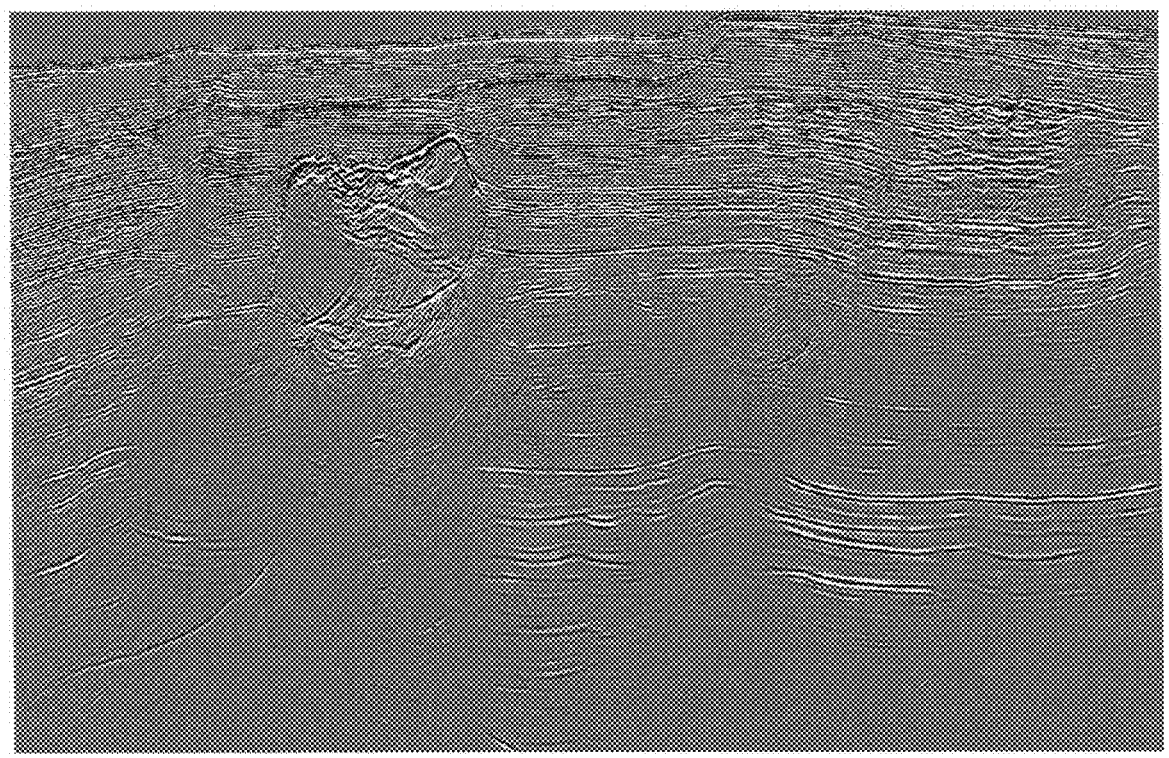
FIGS. 6 and 7 are migrated stacks.
Figure 7:
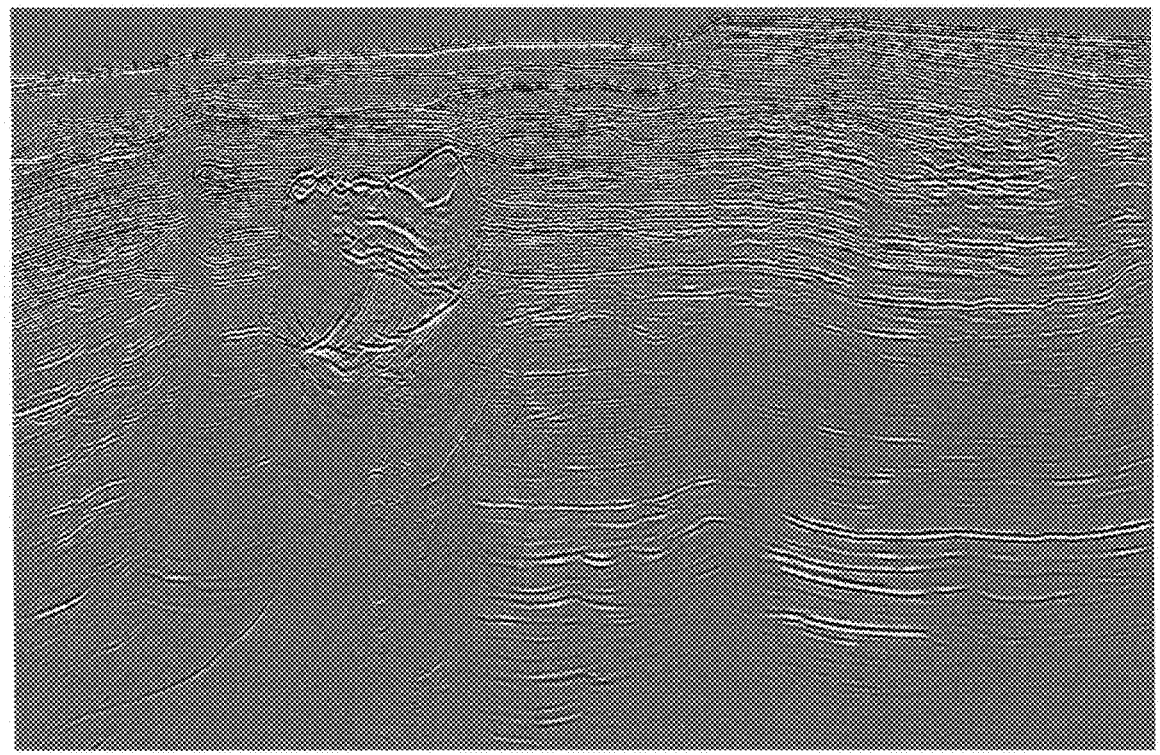
Figure 9A:
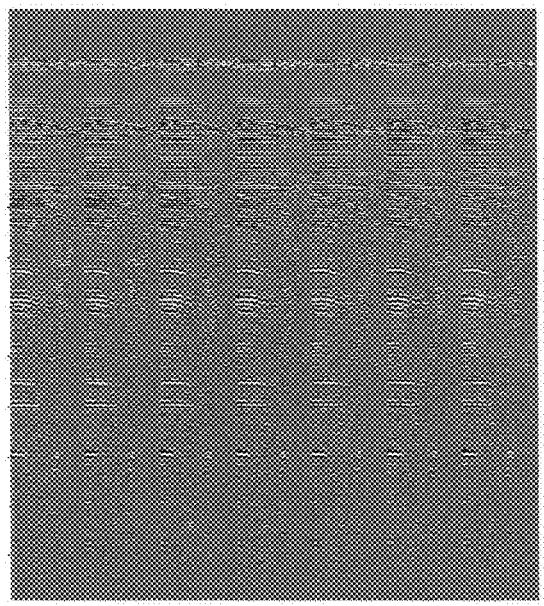
FIGS. 9A and 9B are example migrated angle image gathers.
Figure 9B:
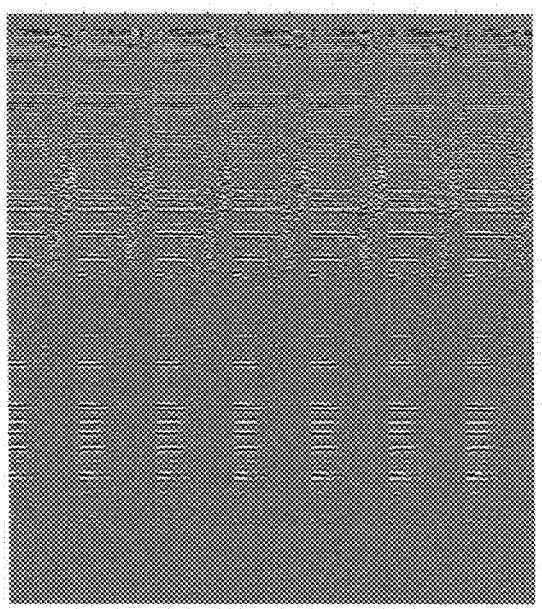

FIG. 6 is a stacked image obtained by synthesizing all diplets from all shot records after migration. No post-migration processing is done prior to final stacking. FIG. 7 shows the same result after muting each angle gathers prior to the final stacking.

Both offset image gathers and angle image gathers are computed post migration by binning and sorting image diplets followed by syntheses. They are shown in sets: FIGS. 8A and 8B and 9A and 9B, respectively. Note the gathers are flat because the exact velocity model is used in the migration. Also, note that there are a lot of multiples in the migrated gathers because no attempt was made to removing multiples either prior to or post migration.

In some example implementations, the outputs of the methods described in this disclosure (e.g., one or more of migrated seismic volume 1035 and migrated seismic gathers 1040) are used in one or more of existing velocity analysis techniques, tomographic velocity updating, AVO study, pore pressure predictions, and prestack seismic interpretation workflows.

The methods of the present disclosure described above may be implemented in software to run on one or more computers, where each computer includes one or more processors, a memory, and may include further data storage, one or more input devices, one or more output devices, and one or more networking devices. The software includes executable instructions stored on a tangible medium.

The above methods may be used to determine where to perform subterranean activities, such as well placement, drilling or fracturing. The methods described above may be used to control activities such as well placement, drilling or fracturing.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure.

The depicted and described examples are not exhaustive of the invention. Consequently, the invention is intended to be limited only by the spirit and scope of the appended claims, giving full cognizance to equivalents in all respects.

What is claimed is:

1. A method comprising:
   receiving seismic records indicative of time samples;
   using a processor-based machine to decompose the time samples into a set of diplets, wherein each diplet is indicative of a wavelet that is associated with a dip and each time sample is associated with a plurality of diplets such that each time sample is associated with a plurality of dips;
   migrating one or more diplets of the set of diplets from an unmigrated domain to a migrated domain, wherein migrating is performed using a velocity model; and
   synthesizing one or more of the migrated diplets to an output multi-dimensional seismic volume.

2. The method of claim 1, further comprising:
   binning and sorting one or more migrated diplets to produce a set of binned migrated gathers; and
   wherein, synthesizing one or more of the migrated diplets to an output multi-dimensional seismic volume is performed on the set of binned migrated diplets to produce one or more migrated gathers.

3. The method of claim 2 wherein the migrated gathers are selected from a group consisting of offset gathers, angle gathers, azimuth gathers, and combinations gathers.

4. The method of claim 1, wherein the velocity model comprises an anisotropic velocity model.

5. The method of claim 1, further comprising:
   performing pre-migration processing on the set of diplets to generate a diplet subset.

6. The method of claim 1, further comprising:
   performing pre-migration processing on the set of diplets to separate signal from noise.

7. The method of claim 1, further comprising:
   performing pre-migration processing on the set of diplets to enhance signal.

8. The method of claim 1, wherein each diplet comprises information about spatial location, orientation, amplitude, an associated wavelet, acquisition configuration and coherency.

9. An article comprising a computer readable non-transitory storage medium to store instructions that when executed by a computer cause the computer to:
   receive seismic records indicative of time samples;
   decompose the time samples into a set of diplets, wherein each diplet is indicative of a wavelet that is associated with a dip and each time sample is associated with a plurality of diplets such that each time sample is associated with a plurality of dips;
   migrate one or more diplets of the set of diplets from an unmigrated domain to a migrated domain, wherein migrating is performed using a velocity model; and
   synthesize one or more of the migrated diplets to an output multi-dimensional seismic volume.

10. The article of claim 9, the storage medium storing instructions that when executed by the computer cause the computer to:
    bin and sort one or more migrated diplets to produce a set of binned migrated gathers.

11. The article of claim 10, wherein the migrated gathers are selected from a group consisting of offset gathers, angle gathers, azimuth gathers, and combinations gathers.

12. The article of claim 9, wherein the velocity model comprises an anisotropic velocity model.

13. The article of claim 9, the storage medium to store instructions that when executed by the computer cause the computer to:
    perform pre-migration processing on the set of diplets to generate a diplet subset.

14. The article of claim 9, the storage medium to store instructions that when executed by the computer cause the computer to:
    perform pre-migration processing on the set of diplets to separate signal from noise.

15. The article of claim 9, the storage medium to store instructions that when executed by the computer cause the computer to:
    perform pre-migration processing on the set of diplets to enhance signal.

16. A system comprising:
    an interface to receive seismic records indicative of time samples; and
    at least one processor to:
       decompose the time samples into a set of diplets, wherein each diplet is indicative of a wavelet that is associated with a dip and each time sample is associated with a plurality of diplets such that each time sample is associated with a plurality of dips.

17. The system of claim 16, wherein said at least one processor is further adapted to:
    migrate one or more diplets of the set of diplets from an unmigrated domain to a migrated domain, wherein migrating is performed using a velocity model; and
    synthesize one or more of the migrated diplets to an output multi-dimensional seismic volume.

18. The system of claim 17, wherein said at least one processor is further adapted bin and sort one or more migrated diplets to produce a set of binned migrated gathers.

19. The system of claim 18 wherein the migrated gathers are selected from a group consisting of offset gathers, angle gathers, azimuth gathers, and combinations gathers.

20. The system of claim 16, wherein each diplet comprises information about spatial location, orientation, amplitude, an associated wavelet, acquisition configuration and coherency.

* * * * *